United States Patent Office  3,723,253
Patented Mar. 27, 1973

3,723,253
PRODUCTION OF ALPHA-1,6-GLUCOSIDASE
Yasuyuki Yokobayashi, Suita-shi, Osaka, and Kazuo Masuda, Okayama-shi, Okayama, Japan, assignors to Hayashibara Company, Okayama, Japan
No Drawing. Filed July 8, 1969, Ser. No. 840,040
Claims priority, application Japan, July 10, 1968,
43/48,273
Int. Cl. C07g 7/028
U.S. Cl. 195—66 R                                           7 Claims

ABSTRACT OF THE DISCLOSURE

The production of alpha-1,6-glucosidase by the culture of an alpha-1,6-glucosidase productive bacterium is carried out by using a culture medium containing starch hydrolyzate as a carbon source and a member selected from the group consisting of soybean cake hydrolyzate and a mixture thereof with an ammonium salt as a nitrogen source.

---

This invention relates to a process of producing a large amount of alpha-1,6-glucosidase. More particularly, this invention relates to a method of producing a large amount of alpha-1,6-glucosidase by the culture of the organism producing alpha-1,6-glucosidase upon a culture medium, which contains ammonium salts, soybean cake hydrolyzates or mixtures thereof as nitrogen source and soluble starch, liquefied starch, glutinous rice starch or maltose as carbon source, the produce and accumulate a large amount of alpha-1,6-glucosidase in the culture medium.

Alpha-1,6-glucosidase is an enzyme capable of specifically acting on the cleavage of alpha-1,6-glucosidic linkage at the branched position of the amylopectin on the starch.

It was reported by Bender et al. in 1961 that alpha-1,6-glucosidase (they named this as pullulanase) could be obtained by the method of the culture of a strain of Aerobacter aerogenes (by Hans Bender, Kurt Wallemfals, Bischemische Zeitschrift, 334 79–95 (1969)). Bender et al. reported that an enzyme solution with high activity was produced by the culture by using a culture medium which contains inorganic or organic nitrogen as nitrogen source and the enzyme is an induction enzyme, being especially inducted with maltose, maltotriose and pullulan.

The present inventors concentrated their efforts in paying attention to the substrate specificity of the alpha-1,6-glucosidase, in the search of an industrial method for producing a large amount of alpha-1,6-glucosidase. As the result, it has been found that when using ammonium salts, soybean cake hydrolyzates or mixtures thereof as a nitrogen source and soluble starch, liquefied starch, soluble glutinous rice starch or maltose as a carbon source, a large amount of alpha-1,6-glucosidase may be notably produced and accumulated in the culture medium.

An object of the present invention is to provide an alpha-1,6-glucosidase which has high activity.

A further object of the present invention is to provide a novel process for producing a large amount of alpha-1,6-glucosidase by the culture of Aerobacter aerogenes (A.T.C.C. 8724) or Pseudomonas amyloderamosa (described in patent application No. 733,326. A.T.C.C. 21,262, now U.S. Pat. No. 3,560,345).

A still further object of the present invention is to produce an alpha-1,6-glucosidase with a high degree of activity in a simple and efficient manner using a culture medium, which is cheap and easily obtainable, in high yield.

The present invention will be more fully described hereunder following some experimental examples.

In the present invention the bacteria of the genus of Agrobacterium, Azotobacter, Erwinia, Stapylococcus, Streptococcus, Serratia, Sarcina, Bacillus, Pediococcus, Micrococcus, Microbacterium, Lactobacillus, or Leuconostoc as well as the above mentioned two kinds of organisms can be used for producing an alpha-1,6-glucosidase. When the organism is cultured in conformity with the object of the present invention it is essential to use ammonium salts, soybean cake hydrolyzates or a mixture thereof as a nitrogen source and soluble starch, soluble glutinous rice starch, acid- or enzyme-liquefied starch or maltose as a carbon source in the culture medium. The soybean cake hydrolyzate is the material which is prepared by extracting soybean cake with acid or protease etc. There are many kinds of soybean cakes, for example high temperature extracted cake and low temperature extracted cake etc., the soybean cake rich in nitrogen is convenient.

The amount of the soybean cake hydrolyzates used in the culture medium is from 2 to 5% preferably 3%. The ammonium salts are $NH_4NO_3$, $(NH_4)_3PO_4$, $NH_4OOCCH_3$ and $(NH_4)_2SO_4$ etc. The amount of the ammonium salts used in the culture is preferably amount 0.5%.

The mixture of the ammonium salt and the soybean cake hydrolyzate can be also used as a nitrogen source.

The soluble glutinous rice starch as a carbon source is the material which is prepared by steeping glutinous rice in a diluted hydrochloric acid and the liquefied starch is of the material which is prepared by liquefying starch with acid or alpha-amylase. The so-called soluble-starch and maltose can be also used as a carbon source. The Dextrose Equivalent of these materials is preferably from 2 to 15%. And the amount of such materials used in the culture should be from 0.5 to 1.5%. Below 0.5% is not acceptable.

The mineral salts like potassium, magnesium, ferrous or phosphorous salts are used as other ingredients of the culture medium. The amount of these mineral salts are prerferably from 0.05 to 0.001%.

The culture should be conducted at from 25° C. to 36° C., preferably 30° C. for from 2 to 3 days under aerobic condition with agitation. The pH of the culture medium is slightly variant but it is usual to be near 7.

The culture with Aerobacter aerogenes is usually conducted with a pH of 6–9 and the culture with Pseudomonas amyloderamosa is usually conducted with a pH of below 7.

When the culture under aeration is taken for culturing said organisms the quantity of air introduced is conveniently less than the quantity of the culture fluid, because the organisms can fully grow under said air conditions.

The present invention will be more fully described hereunder following some experimental examples.

EXPERIMENT 1

The reconfirming try on the experiments of Bender et al.

Following the method described in Bender et al. (supra), the culture medium of the composition given in Table 1 and 2 were cultured with the strain of Aerobacter aerogenes as follows:

A streak culture medium composed of

| | Percent |
|---|---|
| Peptone | 1.0 |
| $MgSO_4 \cdot 7H_2O$ | 0.05 |
| $FeSO_4 \cdot 7H_2O$ | 0.001 |
| Yeast extract | 0.5 |
| KCl | 0.05 |
| Maltose | 1.0 | was inoculated with *Aerobacter aerogenes* (ATCC 8724) and the strain was engaged in a preliminary culture for 20 hours. The resulting seed culture was inoculated into a culture given in Table 1 and 2, and cultured at 30° C. for 45 hours.

As the result, it has been found that the organism doesn't grow in the culture medium given in Table 2 so that the resulting solution has no enzyme activity at all. On the other hand the organism grows in the culture medium given in Table 1, but only 15 units/ml. of alpha-1,6-glucosidase are produced. So even the later culture solution isn't enough for the utilization on the industrial purposes without being concentrated.

TABLE 1

|  | Percent |
| --- | --- |
| Peptone | 0.8 |
| NaNO$_3$ | 0.5 |
| K$_2$HPO$_4$ | 0.1 |
| MgSO$_4$·7H$_2$O | 0.05 |
| KCl | 0.05 |
| FeSO$_4$·7H$_2$O | 0.001 |
| Maltose | 0.5 |

TABLE 2

|  | Percent |
| --- | --- |
| NaNO$_3$ | 0.3 |
| K$_2$HPO$_4$ | 0.1 |
| MgSO$_4$·7H$_2$O | 0.05 |
| KCl | 0.05 |
| FeSO$_4$·7H$_2$O | 0.001 |
| Maltose | 0.5 |

*The determination of enzyme activity shown hereunder was conducted as follows:*

|  | Ml. |
| --- | --- |
| A reaction mixture consisting of enzyme solution | 1.0 |
| 1% soluble glutinous rice starch solution | 5.0 |
| 0.5 M acetate buffer solution (pH 6) | 1.0 | was incubated at 40° C. for 30 minutes.

0.5 ml. of the reaction mixture was withdrawn and mixed with 0.5 ml. of 0.01 M iodine solution and 15 ml. of water. After 15 minutes the absorbency at a wave length of 610 M was determined and the enzyme activity for altering the absorbency by 0.1 was deemed as 10 units/ml.

EXPERIMENT 2

Transition of alpha-1,6-glucosidase with different nitrogen sources (A) *Aerobacter aerogenes* and *Pseudomonas amyloderamosa* (ATCC 21,262) as alpha-1,6-glucosidase productive bacterias were used for screening nitrogen sources available in the industrial object in the culture medium.

The culture medium used was composed of members selected from the following three groups.

1. (Carbon source)

Maltose
Liquefied starch 2. (Nitrogen source)

Peptone
Soybean cake
Hydrolyzates
Corn steep liquor
Wheat bran extract
Rice bran extract
Meat extract 3. (Mineral salt)

Fe$^{3+}$
Mg$^{2+}$
K$^+$
P$^{5+}$

The culture medium was sterilized as usual and engaged in shaken culture at 30° C. for 25 days. Thereafter pH, O.D. (Optical Density) and Enzyme Activity of the resulting solution obtained were determined.

The results were as shown in Tables 3-4.

TABLE 3
(a) When *Aerobacter aerogenes* was used

| Nitrogen source (percent) | Carbon Source | | | | | |
| --- | --- | --- | --- | --- | --- | --- |
| | Maltose 1% | | | Liquefied starch 15% | | |
| | O.D. | pH | Unit/ml. | O.D. | pH | Unit/ml. |
| Peptone (1) | .143 | 8.2 | 20 | .350 | 8.5 | 31 |
| Soybean cake hydrolyzate (3) | .260 | 8.7 | 52 | .330 | 8.8 | 110 |
| Corn steep liquor (3) | .330 | 8.6 | 12 | .350 | 8.3 | 15 |
| Wheat bran extract (3) | .70 | 8.5 | 1 | .105 | 8.6 | 2 |
| Meat extract (1) | .70 | 8.5 | 1 | .95 | 8.3 | 2 |
| Rice bran extract (3) | .80 | 8.1 | 3 | .110 | 8.0 | 3 |

NOTE.—O.D.=Optical density; Unit/ml.=Enzyme activity.

TABLE 4
(b) When *Pseudomonas amyloderamosa* was used

| Nitrogen source (percent) | Carbon Source | | | | | |
| --- | --- | --- | --- | --- | --- | --- |
| | Maltose 1% | | | Liquefied starch 15% | | |
| | O.D. | pH | Unit/ml. | O.D. | pH | Unit/ml. |
| Peptone (1) | .121 | 6.9 | 21 | .152 | 7.0 | 23 |
| Soybean cake hydrolyzate (3) | .230 | 7.0 | 45 | .246 | 7.1 | 80 |
| Corn steep liquor (3) | .250 | 6.9 | 15 | .240 | 6.9 | 31 |
| Wheat bran extract (3) | .75 | 7.0 | 2 | .120 | 6.9 | 10 |
| Meat extract (1) | .80 | 7.0 | 2 | .85 | 7.0 | 5 |
| Rice bran extract (3) | .78 | 7.0 | 2 | .93 | 7.0 | 3 |

See note at bottom of Table 3.

(B) The culture medium composed of members selected from the following three groups was cultured with the strains of *Aerobacter aerogenes* and *Pseudomonas amyloderamosa* in the same manner as described in (A).

1. (Carbon source)

Liquefied starch
Maltose 2. (Nitrogen source)

Urea
Sodium nitrate
Ammonium phosphate
Ammonium nitrate
Corn steep liquor 3. (Mineral salt)

$Fe^{3+}$
$Mg^{2+}$
$K^+$
$P^{5+}$

The results were as shown in Tables 5-6.

TABLE 5

(a) When *Aerobacter aerogenes* was used

| Nitrogen source (percent) | Carbon source | | | | | |
|---|---|---|---|---|---|---|
| | Maltose 1% | | | Liquified starch 15% | | |
| | O.D. | pH | unit ml. | O.D. | pH | unit ml. |
| Urea (0.3) | .120 | 7.1 | 4 | .115 | 7.5 | 3 |
| NaNO₃ (0.4) | .150 | 7.5 | 2 | .143 | 7.6 | 2 |
| Corn steep liquor (0.3) | .180 | 7.6 | 15 | .175 | 7.5 | 13 |
| NH₄NO₃ (0.2) | .210 | 6.7 | 120 | .230 | 6.6 | 14 |
| NH₄SO₃ (0.5) | .320 | 6.5 | 120 | .290 | 6.5 | 30 |
| (NH₄)₃PO₄ (0.4) | .301 | 6.1 | 50 | .215 | 6.1 | 40 |
| NH₄OOC·CH₃ (0.5) | .350 | 8.1 | 130 | .330 | 7.9 | 50 |
| (NH₄)₂SO₄ (0.5) | .310 | 6.5 | 105 | .320 | 6.4 | 98 |

See note at bottom of Table 3.

TABLE 6

(b) When *Pseudomonas amyloderamosa* was used

| Nitrogen source (percent) | Carbon source | | | | | |
|---|---|---|---|---|---|---|
| | Maltose 1% | | | Liquified starch 15% | | |
| | O.D. | pH | unit ml. | O.D. | pH | unit ml. |
| Urea (0.3) | .110 | 7.0 | 1 | .115 | 7.0 | 1 |
| NaNO₃ (0.4) | .151 | 7.0 | 4 | .145 | 7.0 | 3 |
| Corn steep liquor (0.3) | .200 | 7.0 | 15 | .195 | 7.0 | 12 |
| NH₄NO₃ (0.2) | .215 | 6.6 | 10 | .221 | 6.7 | 5 |
| NH₄NO₃ (0.5) | .320 | 6.5 | 68 | .310 | 6.4 | 70 |
| (NH₄)₃PO₄ (0.4) | .325 | 6.2 | 65 | .315 | 6.1 | 65 |
| NH₄OOC·CH₃ (0.5) | .330 | 7.1 | 70 | .347 | 7.0 | 73 |
| (NH₄)₂SO₄ (0.5) | .315 | 6.5 | 67 | .320 | 6.4 | 70 |

See note at bottom of Table 3.

According to the results shown in Tables 3-6, it has been found that the use of ammonium salts, soybean cake hydrolyzate as a nitrogen source in the culture medium is obviously successful for producing an alpha-1,6-glucosidase and the enzyme with high activity may be also produced when using peptone, corn steep liquor, urea as a nitrogen source. But peptone isn't available for the industrial purpose because of its high cost.

EXPERIMENT 3

Transition of alpa-1,6-glucosidase with different carbon sources (A) The culture medium composed of members selected from the following three groups was cultured with the strain of *Aerobacter aerogenes* and *Pseudomonas amyloderamosa* in the same manner as described in Experiment 2–(A).

1. (Carbon source)

Maltose
Liquefied starch
Soluble glutinous rice starch
Sorbite
Lactose
Mannite
Glycerin 2. (Nitrogen source)

Soybean cake
Hydrolyzates
Peptone 3. (Mineral salt)

$Fe^{3+}$
$Mg^{2+\prime}$
$K^+$
$P^{5+}$

The results were as shown in Tables 7-8.

TABLE 7

(a) When *Aerobacter aerogenes* was used

| Carbon source (percent) | Nitrogen source | | | | | |
|---|---|---|---|---|---|---|
| | Soybean cake hydrolyzate | | | Peptone | | |
| | O.D. | pH | Unit/ml. | O.D. | pH | Unit/ml. |
| Maltose (0.5) | .220 | 9.0 | 50 | .190 | 8.9 | 20 |
| Liquefied starch (0.5) | .250 | 9.0 | 110 | .210 | 9.0 | 30 |
| Soluble starch (0.5) | .200 | 8.9 | 70 | .210 | 8.9 | 60 |
| Soluble glutinous rice starch (0.5) | .180 | 8.9 | 60 | .170 | 9.0 | 55 |
| Sorbite (0.5) | .153 | 8.7 | 0 | .160 | 8.8 | 1 |
| Lactose (0.5) | .140 | 8.8 | 0 | .130 | 9.9 | 0 |
| Mannite (0.5) | .160 | 9.0 | 0 | .140 | 8.9 | 0 |
| Glycerin (0.5) | .135 | 8.8 | 5 | .185 | 8.9 | 3 |

See note at bottom of Table 3.

TABLE 8

(b) When *Pseudomonas amyloderamosa* was used

| Carbon source (percent) | Nitrogen source | | | | | |
|---|---|---|---|---|---|---|
| | Soybean cake hydrolyzate | | | Peptone | | |
| | O.D. | pH | Unit/ml. | O.D. | pH | Unit/ml. |
| Maltose (0.5) | .185 | 7.0 | 45 | .190 | 6.9 | 21 |
| Liquefied starch (0.5) | .250 | 7.0 | 80 | .260 | 7.0 | 23 |
| Soluble glutinous rice starch (0.5) | .210 | 6.9 | 99 | .230 | 7.0 | 25 |
| Soluble starch (0.5) | .230 | 6.8 | 100 | .210 | 6.9 | 28 |
| Sorbite (0.5) | .140 | 7.0 | 0 | .150 | 6.8 | 0 |
| Lactose (0.5) | .160 | 6.9 | 0 | .160 | 6.9 | 0 |
| Mannite (0.5) | .150 | 6.9 | 0 | .140 | 7.0 | 0 |
| Glycerin (0.5) | .165 | 6.9 | 3 | .145 | 6.8 | 2 |

See note at bottom of Table 3.

(B) The culture medium composed of members selected from the following three groups was culture with the strain of *Aerobacter aerogenes* and *Pseudomonas amyloderamosa* in the same manner as described in Experiment 2–(A).

1. (Carbon source)

Soluble starch
Soluble glutinous rice starch
Liquefied starch
Maltose
Mannite
Glycerin 2. (Nitrogen source)

Ammonium nitrate
Ammonium acetate 3. (Mineral salt)

$Fe^{3+}$
$Mg^{2+}$
$K^+$
$P^{5+}$

The results were as shown in Tables 9–10.

A medium composed of

| | Percent |
|---|---|
| Soybean cake hydrolyzate | 3 |
| $K_2HPO_4$ | 0.1 |
| $MgSO_4 \cdot 7H_2O$ | 0.05 |
| KCl | 0.02 |
| $FeSO_4 \cdot 7H_2O$ | 0.001 |
| Liquefied starch | 1.5 | was poured into each flask, adjusted to pH 7.3 and sterilized under atmostpheric pressure for 30 minutes. The medium was inoculated with one platinum loop of the resulting seed culture and the charge was engaged in shaken culture at 30° C. for 70 hours. The activity of the resulting a lpha-1,6-glucosidase obtained was 122 units/ml. The soybean cake hydrolyzate used was prepared as follows. A defatted soybean was steeped into water 9 times as much as the defatted soybean and was incubated with 5% of Neosbitase (neutral protease produced by Nagase Sangyo Kabushiki-Gaisha of Japan) at 40° C. for 5 hours. After filtrating 3% of the resulting solution obtained was the soybean cake hydrolyzate.

TABLE 9

| | Nitrogen source (percent) | | | | | |
|---|---|---|---|---|---|---|
| | Ammonium nitrate (0.5) | | | Ammonium acetate (0.6) | | |
| Carbon source (percent) | O.D. | pH | Unit/ml. | O.D. | pH | Unit/ml |
| Maltose (0.5) | .310 | 6.7 | 30 | .290 | 6.6 | 40 |
| Liquefied starch (0.5) | .351 | 6.5 | 120 | .360 | 6.5 | 115 |
| Soluble glutinous rice starch (0.5) | .290 | 6.8 | 85 | .310 | 6.5 | 90 |
| Soluble starch (0.5) | .310 | 6.7 | 90 | .305 | 6.6 | 87 |
| Sorbite (0.5) | .140 | 6.7 | 1 | .130 | 6.8 | 2 |
| Lactite (0.5) | .120 | 6.5 | 0 | .140 | 6.7 | 1 |
| Mannite (0.5) | .115 | 6.8 | 0 | .115 | 6.8 | 0 |
| Glycerin (0.5) | .150 | 6.8 | 3 | .170 | 6.7 | 5 |

See note at bottom of Table 3.

TABLE 10

When *Pseudomonas amyloderamoso* was used

| | Nitrogen source (percent) | | | | | |
|---|---|---|---|---|---|---|
| | Ammonium nitrate (0.5) | | | Ammonium acetate (0.6) | | |
| Carbon source (percent) | O.D. | pH | Unit/ml. | O.D. | pH | Unit/ml |
| Maltose (0.5) | .290 | 6.6 | 68 | .300 | 6.5 | 65 |
| Liquefied starch (0.5) | .305 | 6.5 | 70 | .310 | 6.5 | 69 |
| Soluble glutinous rice starch (0.5) | .315 | 6.4 | 69 | .320 | 6.6 | 71 |
| Soluble starch (0.5) | .320 | 6.5 | 80 | .300 | 6.5 | 82 |
| Sorbite (0.5) | .140 | 6.8 | 0 | .130 | 6.7 | 0 |
| Lactose (0.5) | .120 | 6.8 | 1 | .120 | 6.8 | 0 |
| Mannite (0.5) | .125 | 6.7 | 1 | .120 | 6.7 | 1 |
| Glycerin (0.5) | .130 | 6.7 | 3 | .135 | 6.7 | 3 |

See note at bottom of Table 3.

As the results from Tables 7–10 show it has been found that the use of soluble starch, soluble glutinous rice starch, liquefied starch, maltose as a carbon source in the culture medium is obviously successful for producing an alpha-1,6-glucosidase, and the use of sugar alcohol like sorbite, mannite, glycerin as a carbon source in the culture medium isn't available.

EXAMPLE 1

A streak culture medium composed of

| | Percent |
|---|---|
| Peptone | 1.0 |
| Yeast extract | 0.5 |
| $MgSO_4 \cdot 7H_2O$ | 0.05 |
| KCl | 0.05 |
| $FeSO_4 \cdot 7H_2O$ | 0.001 |
| Maltose | 1.0 | is inoculated with *Aerobacter aerogenes* and the strain is culture for 20 hours (this culture is used in this example as a seed culture as well as in Examples 2–4).

EXAMPLE 2

A medium composed of

| | Percent |
|---|---|
| Soybean cake hydrolyzate | 1.6 |
| Soluble starch | 1.5 |

(the same mineral salts as in Example 1) was sterilized under atmospheric pressure for 30 minutes. The one platinum loop of the seed culture of Example 1 was inoculated into the culture medium and engaged in shaken culture with a pH of 7.0 at 30° C. for 70 hours. The activity of the resulting alpha-1,6-glucosidase obtained was 95 units/ml.

EXAMPLE 3

Following the method of Example 1 except using 1% of maltose as a carbon source in the main propagation culture, the charge in the flask was sterilized and the one platinum loop of the seed culture was inoculated and engaged in shaken culture with a pH of below 7.5 at 30° C. for 3 days. The activity of the resulting alpha-1,6-glucosidase obtained was 75 units/ml.

EXAMPLE 4

Following the method of Example 1 except using a soluble glutinous rice starch as a carbon source in the main propagation culture which is prepared by steeping glutinous rice into a diluted hydrochloric acid and solubilized, the culture medium inoculated with the seed culture was engaged in shaken culture with a jar-fermenter with a pH of 7.0 at 30° C. for 2 days which introducing a half quantity of air as much as the amount of the culture fluid. The activity of the resulting alpha-1,6-glucosidase obtained was 70 units/ml.

EXAMPLE 5

A streak culture medium composed of

|  | Percent |
|---|---|
| Malt extract | 0.5 |
| Peptone | 0.3 |
| Salt | 0.07 |
| Glucose | 0.6 |
| Agar | 2.0 | is inoculated with *Pseudomonas amyloderamosa* and the strain is cultured for 24 hours (this culture is used in this example as a seed culture as well as in Examples 6–7).

A fluid medium composed of

|  | Percent |
|---|---|
| Polypeptone | 1.0 |
| Yeast extract | 0.1 | was inoculated with the seed culture and engaged in shaken culture for 24 hours.

A main propagation culture composed of

|  | Percent |
|---|---|
| Soybean cake hydrolyzate | 1.8 |
| K$_2$HPO$_4$ | 0.1 |
| MgSO$_4$·7H$_2$O | 0.05 |
| Soluble starch or soluble glutinous rice starch | 1.5 | was poured into a jar-fermenter and sterilized. Then 3% of the resulting seed culture obtained aforesaid was added to the main propagation culture and cultured with a pH of below 7.0 at 30° C. for 4 days while introducing 0.3 times quantity of air as much as the volume of the culture fluid and agitating under 300 r.p.m.

The activity of the resulting alpha-1,6-glucosidase obtained was 110 units/ml. for the soluble starch containing culture and 100 units/ml. for the soluble glutinous rice containing culture.

EXAMPLE 6

Following the method of Example 5 except using 2% of liquefied starch or 1.5% of maltose as a carbon source in the main propagation culture, each culture medium was cultured with the seed fluid culture in Example 5 aeration-agitation in a jar-fermenter. At the time, the amount of the seed culture inoculated is 3% and the culture was produced with below a pH of 7.0 at 30° C. for 3 days. The amount of air introduced is 0.5 times of the culture medium. And the air-introducing was stopped when the sugar-consuming in the culture medium was end the activity of enzyme marked the maximum. The activity of the resulting alpha-1,6-glucosidase obtained was 55 units/ml. for the maltose containing culture and 95 units/ml. for the liquefied starch containing culture.

EXAMPLE 7

A culture medium composed of

|  | Percent |
|---|---|
| Maltose | 2 |
| Sodium glutomate | 0.4 |
| (NH$_4$)$_2$HPO$_4$ | 0.3 |
| K$_2$HPO$_4$ | 0.1 |
| MgSO$_4$·7H$_2$O | 0.05 | was poured in 100 ml. portions into each 300 ml. flask and sterilized under one atmospheric pressure for 30 minutes and was inoculated with a seed culture of *Pseudomonas amyloderamosa* and cultured with a pH of below 7.0 at 30° C. for 3 days.

At the time, the minimum pH was 5.4. The total activity of the resulting alpha-1,6-glucosidase obtained was 85 units/ml.

EXAMPLE 8

The preparation of a seed culture (a) The seed culture of *Aerobacter aerogenes*: A streak culture medium composed of

|  | Percent |
|---|---|
| Peptone | 10 |
| Yeast extract | 0.3 |
| MgSO$_4$·7H$_2$O | 0.05 |
| KCl | 0.05 |
| FeSO$_4$ | 0.001 |
| Maltose, 1.0 R. | | was inoculated with one platinum loop of the strain *Aerobacter aerogenes* and the strain was cultured at 30° C. for 20 hours. This culture was used as a seed culture in examples hereafter.

(b) The seed culture of *Pseudomonas aminoderamosa*: A fluid culture medium composed of

|  | Percent |
|---|---|
| Polypeptone | 1.0 |
| Yeast extract | | was inoculated with one platinum loop of the strain of *Pseudomonas amyloderamosa* and cultured at 30° C. for 20 hours. This culture was used as a seed culture in examples hereafter.

EXAMPLE 9

The production of alpha-1,6-glucosidase with the genus Aerobacter (a) 0.5% per gram of the starch used of Neosbitase (neutral protease produced by Nagase Sangyo Kabushiki-Gaisha) was gradually added a streak culture medium composed of

|  | Percent |
|---|---|
| Potato starch | 0.8 |
| Ammonium nitrate | 0.5 |
| K$_2$HPO$_4$ | 0.1 |
| KCl | 0.05 |
| MgSO$_4$·7H$_2$O | 0.05 | and heated to liquefy the potato starch and the culture medium was sterilized under one atmospheric pressure for 30 minutes. Thereafter it was inoculated with 1% of the seed culture of the strain of the genus Aerobacter and cultured at 30° C. for 15 hours.

A main propagation culture medium composed of

|  | Percent |
|---|---|
| Starch | 1.7 |
| NH$_4$NO$_3$ | 0.6 |
| K$_2$HPO$_4$ | 0.2 |
| MgSO$_4$·7H$_2$O | 0.03 |
| FeSO$_4$·7H$_2$O | 0.01 | was poured into a fermenter and 0.6% per gram of the starch of Neosbitase was gradually added under agitation and heated to liquefy the starch contained. Thereafter it was sterilized under one atmospheric pressure for 30 minutes and cooled to 30° C., and inoculated with the seed culture obtained aforesaid and cultured at 30° C. under agitation which introduced the equivalent quantity of air as the culture fluid. After culturing for 48 hours the activity of the resulting alpha-1,6-glucosidase obtained was 120 units/ml.

The progress of the culture was as follows.

| | Time | | | | | |
|---|---|---|---|---|---|---|
| | 0 | 13 | 17 | 28 | 28 | 48 |
| pH | 6.7 | 6.3 | 6.5 | 7.2 | 7.2 | 7.2 |
| O.D | 0 | 203 | 350 | 500 | 500 | 490 |
| Enzyme activity unit (ml.) | | 40 | 85 | 100 | 100 | 120 |

(b) Following the method of Example 9-a) except using maltose instead of starch as a carbon source in the culture medium, the charge in 500 ml. flask was sterilized under one atmospheric pressure for 30 minutes and inoculated with the seed culture of the strain of the genus Aerobacter and cultured at 30° C. for 3 days. The activity of the resulting alpha-1,6-glucosidase obtained was 51 units/ml.

(c) A culture medium composed of

| | Percent |
|---|---|
| Potato starch | 1 |
| $(NH_4)_2HPO_4$ | 0.5 |
| $K_2HPO_4$ | 0.5 |
| KCl | 0.04 |
| $MgSO_4 \cdot 7H_2O$ | 0.05 |
| $FeSO_4 \cdot 7H_2$ | 0.001 | and another culture medium composed of the same members as the former except using 1% of glutinous rice starch solubilized with a diluted hydrochloric acid instead of the potato starch were each sterilized in 500 ml. flasks and inoculated with the seed culture of the strain of the genus Aerobacter and engaged in shaken culture at 30° C. for 3 days and then engaged in autolysis. The total activity of the resulting alpha-1,6-glucosidase obtained was 68 units/ml. for the potato starch and 60 units/ml. for the glutinous rice starch.

(d) A culture medium composed of

| | Percent |
|---|---|
| Soluble starch | 1 |
| $NH_4OOC \cdot CH_3$ | 0.6 |
| $K_2HPO_4$ | 0.6 |
| $K_3PO_4$ | 0.3 |
| KCl | 0.05 |
| $MgSO_4 \cdot 7H_2O$ | 0.05 | and another culture medium composed of the same members as the former except using 1% of maltose instead of the soluble starch were lack sterilized in jar-fermenter and inoculated with the seed culture of the strain of the genus Aerobacter and cultured under the aeration of 600 r.p.m. at 40° C. for about 48 hours. The aeration was stopped when the enzyme activity of the resulting culture fluid marked the maximum. Then the culture fluid obtained was engaged in autolysis.

The total activity of the resulting alpha-1,6-glucosidase was 105 units/ml. for the soluble starch culture medium.

EXAMPLE 10

The production of alpha-1,6-glucosidase with the genus Pseudomonas (a) A main propagation culture medium composed of

| | Percent |
|---|---|
| Soluble starch (D.E. 5) | 1 |
| $(NH_4)_2HPO_4$ | 0.3 |
| $Na_2HPO_4$ | 0.1 |
| $MgSO_4 \cdot 7H_2O$ | 0.05 | and another main propagation culture medium composed of the same members as the former except using 1% of soluble glutinous rice starch instead of the soluble starch were poured each 500 ml. flask and sterilized under one atmospheric pressure for 30 minutes, and inoculated with 2% of the seed culture of the strain of the genus Pseudomonas and engaged in shaken culture with a pH of below 7 at 30° C. for 3 days. The activity of resulting alpha-1,6-glucosidase obtained was 70 units/ml. for the soluble starch and 85 units/ml. for the soluble glutinous starch.

(b) A main propagation culture medium composed of

| | Percent |
|---|---|
| Soluble starch (D.E. 5.0) | 1.0 |
| $NH_4NO_3$ | 0.5 |
| $(NH_4)_2HPO_4$ | 0.15 |
| $KH_2PO_4$ | 0.1 |
| $MgSO_4 \cdot 7H_2$ | 0.05 | and another main propagation culture composed of the same members as the former except using 1% of liquefied starch (D.E. 6.8) instead of the soluble starch were charged in each jar-fermenter and sterilized under one atmospheric pressure for 30 minutes as usual manner, and inoculated with 2% of the seed culture of the strain of the genus Pseudomonas and cultured under aeration-agitation with a pH of below 7 at 30° C. for 48 hours.

The quantity of the air introduced was 0.5–0.2 times as the culture fluid. The aeration was stopped when the enzyme activity of the culture fluid marked the maximum.

The total activity of the resulting alpha-1,6-glucosidase obtained was 110 units/ml. for the soluble starch and 88 units for the liquefied starch.

(c) A culture medium composed of

| | Percent |
|---|---|
| $(NH_4)_2HPO_4$ | 0.15 |
| $(NH_4)_2SO_4$ | 0.1 |
| $K_2HPO_4$ | 0.1 |
| $MgSO_4 \cdot 7H_2O$ | 0.05 |
| Soluble glutinous rice starch, 1.0 R. | | and another culture medium composed of the same members as the former except using 1% of maltose instead of the soluble glutinous rice starch were poured into each 500 ml. flask and sterilized as usual manner, and inoculated with 1% of the seed culture of the strain of the genus Pseudomonas and engaged in shaken culture with a pH of below 7 at 30° C. for 3 days. The activity of the resulting alpha-1,6-glucosidase obtained was 85 units/ml. for the soluble glutinous rice starch and 76 units/ml. for the maltose.

(d) A culture medium composed of

| | Percent |
|---|---|
| $NH_4OOC \cdot CH_3$ | 0.6 |
| $K_2HPO_4$ | 0.1 |
| $MgSO_4 \cdot 7H_2O$ | 0.03 |
| Acid-liquefied potato starch (D.E. 10) | 0.1 | and another culture medium composed of the same members as the former except using 1% of maltose instead of the potato starch were poured into each 300 ml. flask and sterilized under one atmospheric pressure for 30 minutes, and inoculated with 2% of the seed culture of the strain of the genus Pseudomonas and engaged in shaken culture with a pH of below 7 at 30° C. for 3 days. The activity of the resulting alpha-1,6-glucosidase obtained was 90 units/ml. for the liquefied potato starch and 85 units/ml. for the maltose.

What is claimed is:

1. In a process for the production of alpha-1,6-glucosidase by the culture of an alpha-1,6-glucosidase productive bacterium to produce and accumulate alpha-1,6-glucosidase in a culture medium, the improvement which comprises adding to the culture medium not less than 0.5% starch hydrolyzate as a carbon source and a member selected from the group consisting of soybean cake hydrolyzate and a mixture thereof with an ammonium salt as a nitrogen source.

2. In a process according to claim 1 wherein the starch hydrolyzate is a member selected from the group consisting of soluble starch, soluble glutinous rice starch, acid- or enzyme-liquefied starch and maltose.

3. In a process according to claim 1 wherein the ammonium salt is present in an amount of about 0.5% and is selected from the group consisting of ammonium nitrate, ammonium sulphate, ammonium phosphate, ammonium chloride and ammonium acetate.

4. In a process according to claim 1 wherein the alpha-1,6-glucosidase productive bacterium is *Aerobacter aerogenes* (ATCC 8724).

5. In a process according to claim 1 wherein the alpha-1,6-glucosidase productive bacterium is *Pseudomonas amyloderamosa* (ATCC 21262).

6. A process in accordance with claim 1 wherein about 2–5% of said soybean cake hydrolyzate is used.

7. A process in accordance with claim 6 wherein no more than about 1.5% of said starch hydrozylate is used.

References Cited

UNITED STATES PATENTS

| | | | |
|---|---|---|---|
| 3,490,995 | 1/1970 | Wallenfels et al. | 195—66 |
| 3,560,345 | 2/1971 | Yokobayashi et al. | 195—31 |

OTHER REFERENCES

Veda et al.: Applied Microbiology, vol. 15, No. 3, May 1967 (pp. 492–496).

A. LOUIS MONACELL, Primary Examiner

D. M. NAFF, Assistant Examiner